US012679280B2

(12) United States Patent
Schocke et al.

(10) Patent No.: US 12,679,280 B2
(45) Date of Patent: Jul. 14, 2026

(54) HITCH MOUNTED DOOR RACK ASSEMBLY

(71) Applicant: MOD-iT, LLC, Azle, TX (US)

(72) Inventors: Robert C. Schocke, Azle, TX (US); Darryl R. Benson, White Settlement, TX (US)

( * ) Notice: Subject to any disclaimer, the term of this patent is extended or adjusted under 35 U.S.C. 154(b) by 50 days.

(21) Appl. No.: 18/741,598

(22) Filed: Jun. 12, 2024

(65) Prior Publication Data

US 2025/0381918 A1 Dec. 18, 2025

(51) Int. Cl.
*B60R 9/06* (2006.01)

(52) U.S. Cl.
CPC ...................................... *B60R 9/06* (2013.01)

(58) Field of Classification Search
CPC .... B60R 9/06; B60R 2011/0059; B60J 7/106; B60J 7/201; B25H 5/00
USPC ................ 224/519, 509, 501, 532, 536, 324
See application file for complete search history.

(56) References Cited

U.S. PATENT DOCUMENTS

| | | | | |
|---|---|---|---|---|
| 5,845,832 | A | * | 12/1998 | Eichmann ................. B60R 9/06 224/495 |
| 6,695,184 | B2 | * | 2/2004 | Higginbotham, III .... B60R 9/10 224/501 |
| 7,275,670 | B1 | * | 10/2007 | Shumack .................. B60R 9/06 224/518 |
| 10,384,499 | B2 | * | 8/2019 | Schocke ................ B60D 1/065 |
| 10,384,621 | B2 | * | 8/2019 | Mehlen ..................... B60R 9/10 |
| 11,597,329 | B2 | * | 3/2023 | Stump, II .................. B60R 9/06 |
| 12,084,001 | B2 | * | 9/2024 | Smith ........................ B60R 9/06 |
| 2007/0181624 | A1 | * | 8/2007 | Smith ........................ B60R 9/00 224/533 |

* cited by examiner

*Primary Examiner* — Corey N Skurdal
(74) *Attorney, Agent, or Firm* — Law Office of Jeff Williams PLLC; J. Oliver Williams

(57) ABSTRACT

A hitch mount door assembly includes a hitch mount to couple to the hitch of the vehicle. Also included is a subframe assembly coupled to the hitch mount and includes a first end and a second end. The subframe assembly is configured to pivot at the first with both the first end and the second end being distal from the hitch mount. A cargo assembly is configured to hold one or more doors and includes a frame coupled to the subframe assembly. The frame also includes a stabilizer configured to pass through the vehicle door and secure it in a closed latched position on the frame.

18 Claims, 5 Drawing Sheets

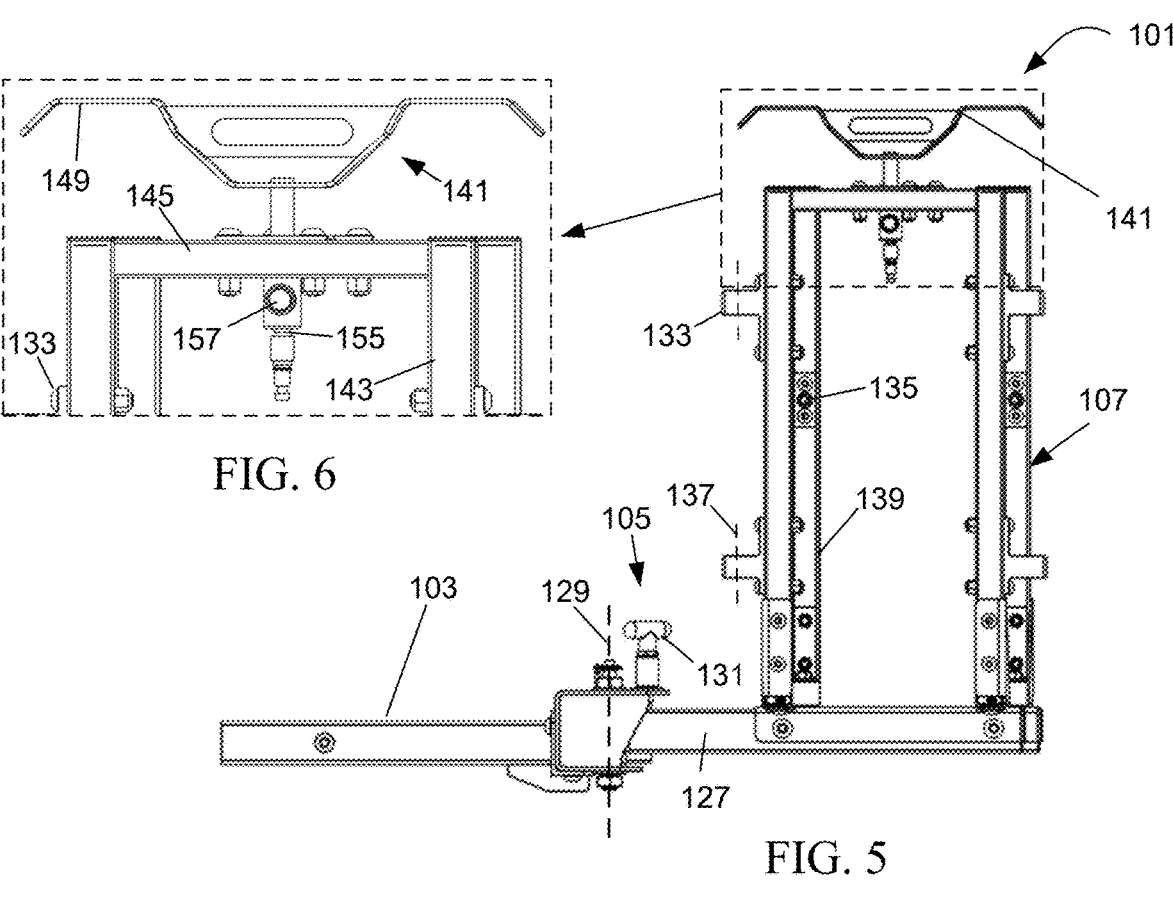
FIG. 6
FIG. 5
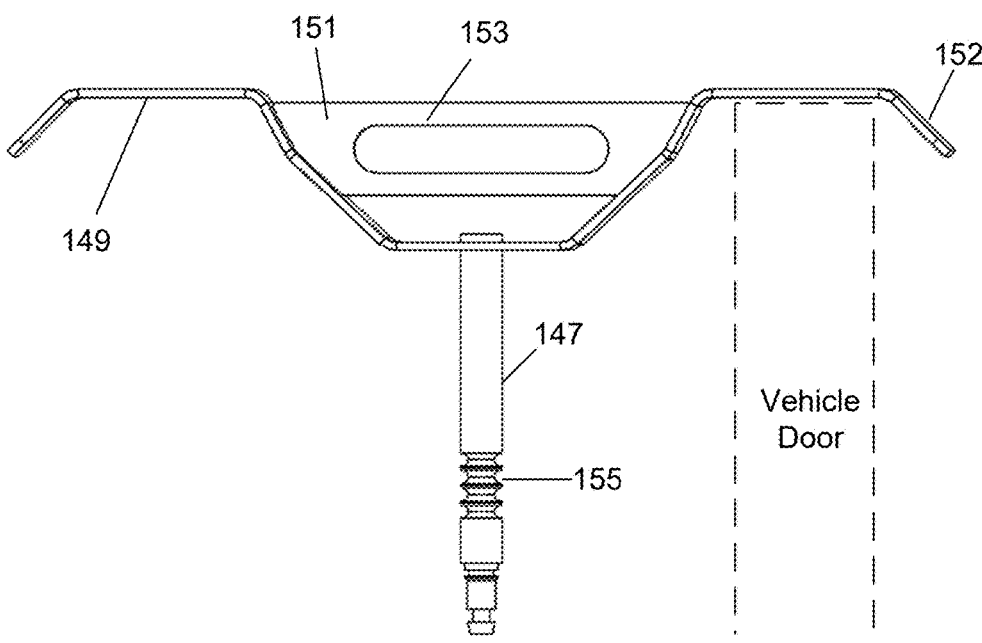
FIG. 7

HITCH MOUNTED DOOR RACK ASSEMBLY

BACKGROUND OF THE INVENTION

1. Field of the Invention

The present application relates to a hitch mounted carrying assembly used with a vehicle, and more particularly to a pivoting assembly for transporting detachable doors.

2. Description of Related Art

Vehicles are a large part of society stemming from their usefulness in transportation, commuting, and entertainment. Over time, vehicles have become more than tools for a purpose and the public have developed loyalty, respect, and love for selected vehicles. An example is the Jeep® brand of vehicles. This brand has a large following among the public. Part of the love of the brand is the ability to remove parts of the exterior body to expose the interior occupants to the outside environment. The ceiling panels may be removed along with doors to name a few.

An issue that commonly arises with the removable doors is how to store them when not attached to the vehicle. In order avoid leaning them against a wall or lying them on the ground where they could become damaged and dirty, some fans have developed a number of devices to hold the doors. One such example is a stand that is located on the ground and configured to hold the doors vertically. The doors are resting on the stand along the bottom edge of the door. Some stands have wheels to allow the stand to roll on the ground. In application, often the stand is located in the garage. Another device is a hanger coupled to a wall where supports are passed through the window frame of the door to hold it. With both of these devices, the doors are stored at the home/garage (or single location). The stand is not easily portable. Therefore the solution works only when the decision to remove and store the doors are made prior to traveling.

In an effort to make the stands more portable, steps have been taken to attach them to the vehicle to allow a user to carry the doors with the vehicle. Some devices are designed to attach to the back of the vehicle around the spare tire. Others are attached to the hitch of the vehicle. In both of these designs, use of these carrying devices prevents access to the rear of the vehicle while installed. The rear doors of the vehicle are restricted from fully opening or permitting access of the driver or occupant to the rear storage area.

What is needed is the ability to selectively move the cargo in the hitch system to permit access to the rear of the vehicle. There are different styles of hitch mounted rack systems in the industry. Often the rack is rigid and permits no rotation leaving the rear door of the vehicle unable to open with the hitch system installed. In only a few examples do racks permit rotation. When done, rotation is typically done through a pivoting arm extending from a hinge centered about the hitch area. Although this may seem effective, it is limited in its applicability as it is operable with only light loads. The small pivot arm fails to stabilize the loads while driving as the pivot arm is typically only half the width of the vehicle.

Although strides have been made to create a safe and secure method of storing doors from a vehicle when removed, shortcomings remain. A new device is needed to carry the elevated weight of vehicle doors. Additionally, the new device should also permit full access to the rear storage area of the vehicle without the need to remove the doors from the carrying device. In addition, a better method of locking the position of the carried doors is needed.

BRIEF SUMMARY OF THE INVENTION

It is an object of the present application to provide a pivoting hitch mounted rack assembly configured to transport detachable vehicle doors. It is desired that the vehicle doors are located in an upright orientation within a door rack assembly and selectively secured in a manner that avoids the need for a manual lock on the door itself. The assembly is configured to permit pivoting of the door rack assembly so as to maneuver the secured doors away from the vehicle and permit rear access into the vehicle.

It is a further object of the present application that pivoting of the door rack assembly occurs in communication with a subframe assembly. The subframe assembly hinges movement of the door rack assembly approximately an equal distance from the tow bar. Preferably the subframe assembly is the full width of the door rack assembly. A lengthened pivot arm helps to maintain balance about the hitch mount.

Another object of the present application is to utilize a door lock swing assembly wherein securing the doors within the door rack assembly is done via restricting natural rotating movement of the doors as opposed to a manual lock on the door. The swing assembly prevents the doors from opening which would allow them to lift off their hinges for removal.

Ultimately the invention may take many embodiments. In these ways, the present invention overcomes the disadvantages inherent in the prior art. The more important features have thus been outlined in order that the more detailed description that follows may be better understood and to ensure that the present contribution to the art is appreciated. Additional features will be described hereinafter and will form the subject matter of the claims that follow.

Many objects of the present application will appear from the following description and appended claims, reference being made to the accompanying drawings forming a part of this specification wherein like reference characters designate corresponding parts in the several views.

Before explaining at least one embodiment of the present invention in detail, it is to be understood that the embodiments are not limited in its application to the details of construction and the arrangements of the components set forth in the following description or illustrated in the drawings. The embodiments are capable of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the various purposes of the present design. It is important, therefore, that the claims be regarded as including such equivalent constructions insofar as they do not depart from the spirit and scope of the present application.

BRIEF DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

FIG. 5 is a right view of the assembly of FIG. 1.

FIG. 6 is an enlarged right view of a stabilizer in the assembly of FIG. 5.

FIG. 7 is an enlarged right view of the stabilizer of FIG. 6.

Figure 1:
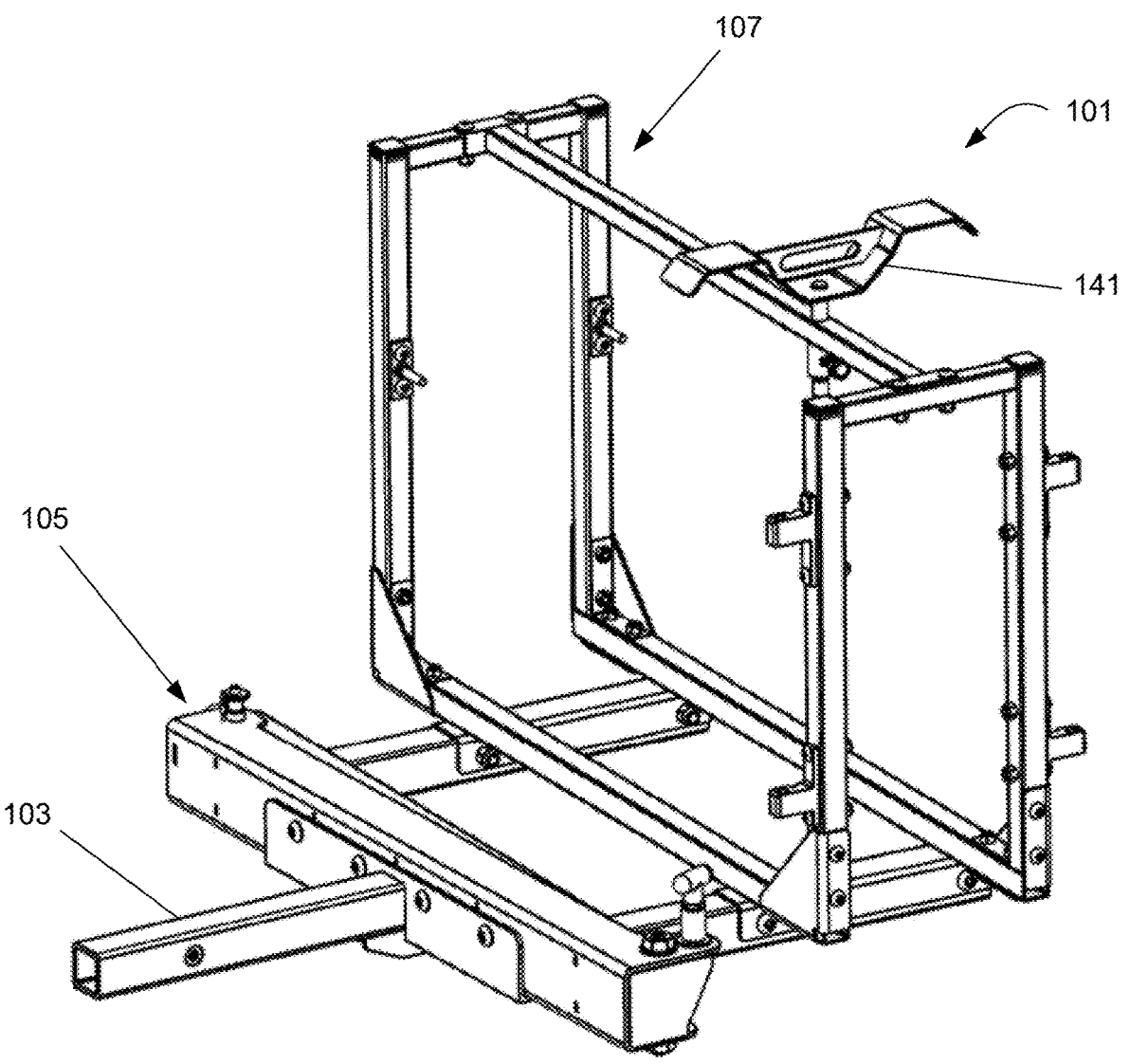
FIG. 1 is a perspective view of a hitch mounted door rack assembly according to an embodiment of the present application.

While the embodiments and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE INVENTION

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the embodiments described herein may be oriented in any desired direction.

The embodiments and method in accordance with the present application overcomes one or more of the above-discussed problems commonly associated with the prior art discussed previously. In particular, the hitch mounted door rack assembly of the present application is configured to transport removable vehicle doors within a door rack sub assembly via a hitch mount. The removable doors carried are secured through a restriction of movement as opposed to a physical lock on the doors itself. These and other unique features are discussed below and illustrated in the accompanying drawings.

The embodiments and method will be understood, both as to its structure and operation, from the accompanying drawings, taken in conjunction with the accompanying description. Several embodiments of the assembly may be presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

Referring now to the Figures wherein like reference characters identify corresponding or similar elements in form and function throughout the several views. The following Figures describe embodiments of the present application and its associated features. With reference now to the Figures, embodiments of the present application are herein described. It should be noted that the articles "a", "an", and "the", as used in this specification, include plural referents unless the content clearly dictates otherwise.

Figure 2:
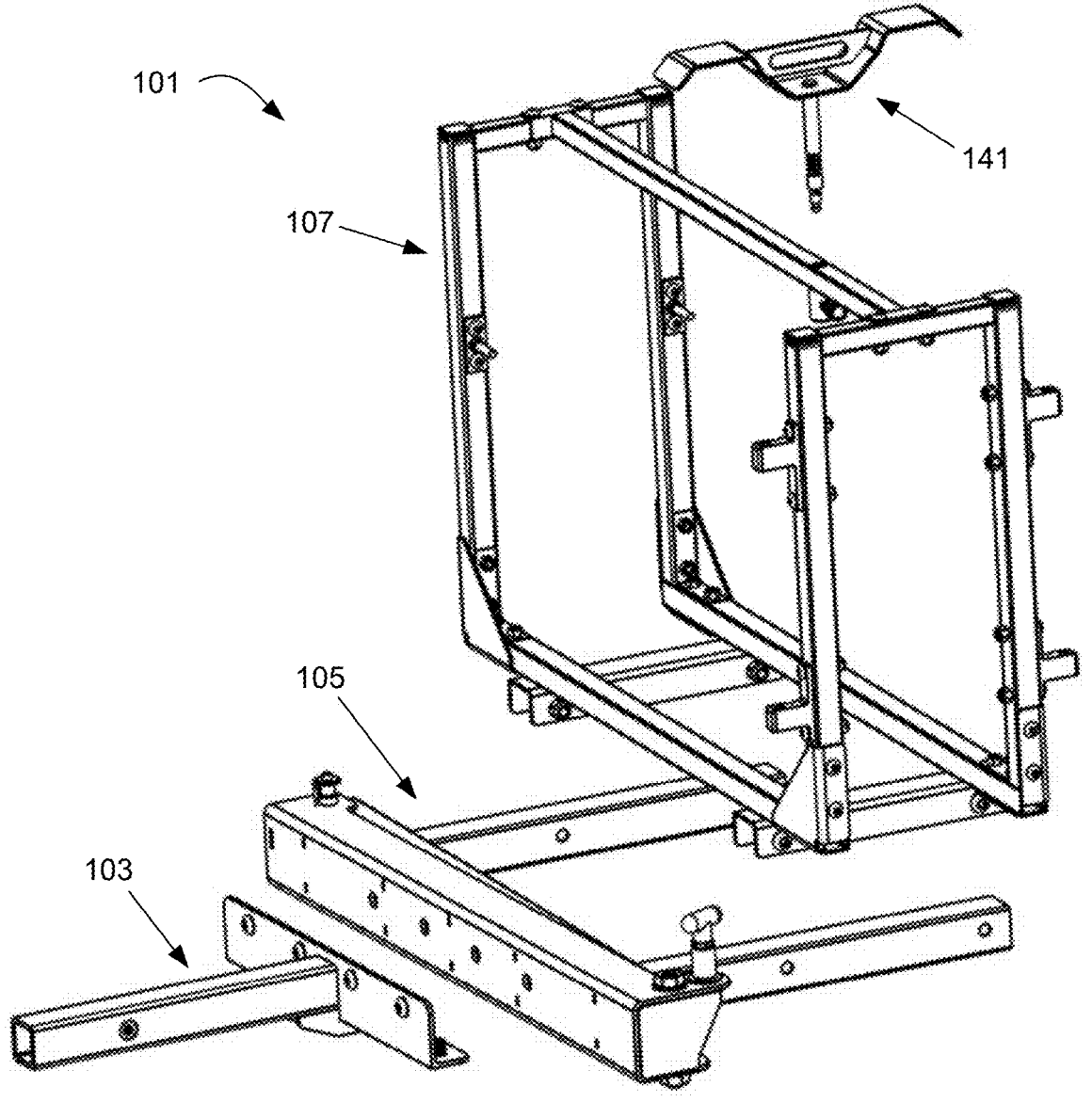
FIG. 2 is a partially exploded view of the hitch mounted door rack assembly of FIG. 1.

Referring now to FIGS. 1-2 in the drawings, a hitch mounted door rack assembly 101 is illustrated. A hitch mount door assembly 101 includes a hitch mount 103, a subframe assembly 105, and a cargo assembly 107. Assembly 101 is configured to provide a hitch mounted assembly for the purpose of carrying a cargo at the rear of a vehicle. In preferred embodiments, the cargo carried is one or more vehicle doors from the vehicle it is attached to. The doors may be located in communication with the cargo assembly 107 and secured. It is an object of the present application that assembly 101 function such that the cargo assembly 107 can be rotated away from the vehicle to permit rear access to the vehicle all while the cargo (i.e. vehicle doors) in cargo assembly 107 remains secured. To facilitate this, another object of the present application is to provide an assembly that selectively pivots at a distal end away from a central portion of the vehicle where the hitch is. This allows for a sufficient swing radius to clear cargo assembly 107 away from vehicle to ideally open rear doors or hatches of the vehicle.

As seen in the Figures, assembly 101 is an externally framed assembly comprising one or more individual elements. Assembly 101 is separable two individual components so as to make the assembly modular in nature. One or more fasters are used in various locations to couple each element to one another. For example, hitch mount 103 is coupled two subframe assembly 105 be a one or more fast. Additionally cargo assembly 107 is coupled to a portion of subframe assembly 105. The modular nature of assembly 101 allows different elements to be swapped out. For example, cargo assembly 107 maybe detached from subframe assembly 105 and interchanged with a separate embodiment style of cargo assembly 107. This may be useful when handling different types of cargo. The figures in the present application are illustrative of a singular embodiment style for cargo assembly 107 but it is understood that other forms may be permitted. Exemplary forms may include a tray, netting, straps, or other cargo carrying apparatus.

Hitch mount 103 is configured to have an elongated section that engages with the receiver of a vehicle. An aperture passes through hitch mount 103 so as to receive the hitch pin associated with the hitch of the vehicle. The precise location a long hitch mount 103 for the aperture is selected according to design constraints and may be varied between models of assembly 101 in some situations based upon vehicular constraints and design. Hitch mount 103 is configured to releasably attach to a portion of subframe assembly 105. As seen in the figures hitch mount 103 partially passes underneath subframe assembly 105 so as to provide additional strength and support to the overall structure.

Subframe assembly 105 is configured to link cargo assembly 107 to hitch mount 103. Subframe assembly 105 is configured to also selectively rotate or pivot so as to swing or adjust the location of cargo assembly 105 relative to hitch mount 103. Cargo assembly 107 is releasably coupled to sub frame assembly 105 and is configured to carry a load of some shape and size. As noted above and ideal form of cargo would be that of vehicle doors associated with the vehicle with which assembly 101 is connected. It is understood that associated off road vehicles may include detachable doors. Drivers of the vehicles may desire to remove such doors during operation of the vehicle. Assembly 101 is configured to provide a location to hold one or more doors within cargo assembly 107. Although cargo assembly 107 is illustrated within a particular embodiment in the drawings, it is understood that cargo assembly 107 may be in other forms. The detachable nature of cargo assembly 107 allows it to be interchangeable with the different forms that it may take.

Figures 3, 4:
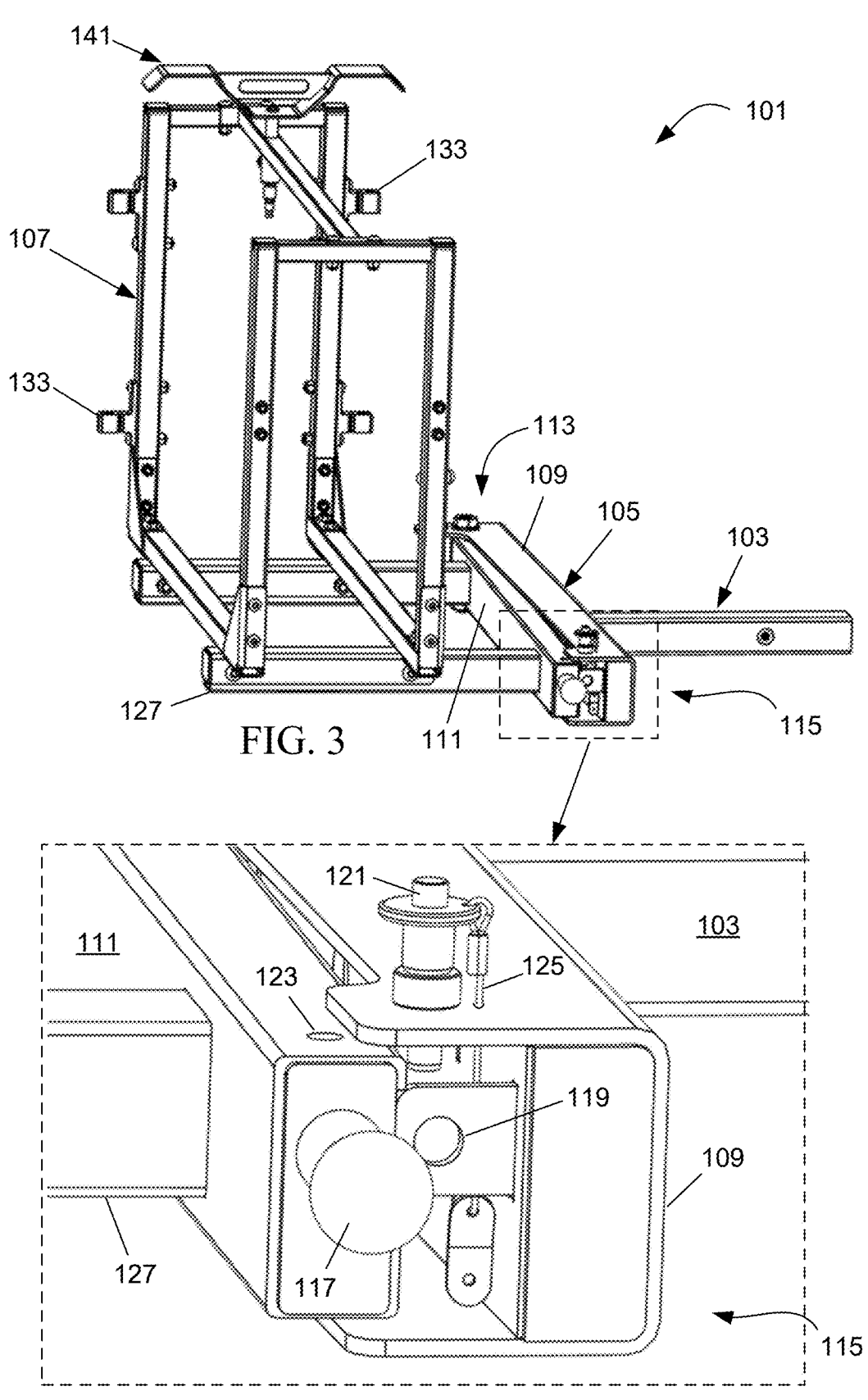
FIG. 3 is a left perspective view of the assembly of FIG. 1.
FIG. 4 is an enlarged section view of a subframe in the assembly of FIG. 1.

Referring now also to FIGS. 3-5 in the drawings, views of subframe assembly 105 and its function are illustrated. Subframe assembly 105 includes a first arm 109 and a second arm 111. First arm 109 is configured to be selectively coupled to hitch mount 103. The second arm 111 is pivotally coupled to 1st arm 109 along first end 113. A second end 115 is located opposite first end 113. Subframe assembly 105 is configured to pivot about first end 113 such that second arm 111 radially moves away from first arm 109 at second end 115. Rotation or pivoting of the second arm 111 facilitates positional change of cargo assembly 107 from hitch mount 103.

Referring in particular to FIG. 4 of the drawings, and enlarged perspective view of second end 115, as seen in FIG. 3 is provided. Subframe assembly 105 is configured to include a dual lock assembly configuration which comprises the use of two individual locking devices. First arm 109 is configured to have an open side such that second arm 111 is configured to translate within a portion of first arm 109. This acts to minimize space as well as facilitate the interlocking and securement of first arm 109 with second arm 111.

Subframe assembly 105 includes a first locking device Which is configured to hold second arm 111 to that of first arm 109. The first locking device includes a translating shaft 117 located externally at second and 115 and configured to pass through and end of second arm 111. Shaft 117 is able to be grasped by a user and pulled longitudinally away from arm 111 so as to retract it's shaft extending therein. The first locking device also includes an attached tab 119 and associated aperture to that of first arm 109. Shaft 117 is configured to selectively translate within tab 119 and its aperture thereby preventing rotation of second arm 111. Translating shaft 117 maybe spring loaded or biased in its movement so as to automatically return to a withdrawn position.

Subframe assembly 105 also includes a second locking device which is configured to provide a secondary securement location to help ensure retention of second arm 111 to that of first arm 109. The second locking device includes a pin 121 configured to pass through first arm 109 and extend into second arm 111 via an aperture 123. The second locking device further includes a tether 125 configured to Restrict translating movement of pin 121, such that pin 121 is unable to withdraw from aperture 123 without removal of tether 125. Tether 125 is coupled to a portion of Oct. 1, 2021 and a portion of first arm 109. Tether 125 may pass through a portion of first arm 109 as seen in the figures.

A primary use of the first locking device is to initially secure the second arm 111 to the first arm 109. A primary use of the second locking device is to ensure that arms 109 and 111 do not inadvertently release. In operation it is preferred that the second locking device is utilized especially during transportation when a vehicle may be traveling at higher speeds and over uneven grounds. The first locking device is suitable when the vehicle is stationary or at very low speeds. The use of two locking assemblies are configured to provide increased function and speed of operation for a user when handling cargo for operating assembly 101, while still facilitating enhanced security during travel. The second locking device acts as a fail safe to the first locking device.

It is further noted that subframe assembly 105 includes one or more extension 127 that extend horizontally out from arm 111. It should be understood that subframe assembly 105 is illustrated in a partially open orientation in the figures. This allows for the internals and locking devices to be shown in more clarity. It is understood that second arm 111 rotates or pivots about an axis 129 located at first end 113. Second end second arm 111 may then be further open to either reach or extend beyond 90° angle with first arm 109. When second arm 111 is rotated about access 129 such that the first locking device is engaged, the second arm is oriented in a closed orientation. An open orientation would permit a user access to the rear of a vehicle while maintaining the cargo assembly 107.

It should be understood that first and 113 and the 2nd and 1:15 are distal from hitch mount 103. This allows axis 129 to be located far away from hitch mount 103. Preferred that the first end and the second end are equally distant/distal from hitch mount 103. In one embodiment the distance from axis 129 to that of hitch mount 103 would be equal to the distance of half the width of the vehicle.

Referring in particular to FIG. 5 in the drawings, a side view of assembly 101 is illustrated. First end 113 is more clearly shown in FIG. 5 so as to illustrate the location of axis 129. Latch 131 is also clearly illustrated and is configured to temporarily secure second arm 111 within a selected open orientation so as to prevent unwanted swinging of second arm 111. Latch 131 is coupled to first arm 109 at first end 113 and selectively engages second arm 111 to temporarily hold subframe assembly 105 at one or more open orientation set points. These set points may be pre set upon manufacture or maybe selected as desired by the user in real time. An example of this could be a fully open orientation. In another example latch 131 may engage second arm 111 in a half open orientation which may be sufficient to allow a user to have limited access to the rear of the vehicle. It is conceived that latch 131 may operate in a similar form and function to that of the first locking device and translating shaft 117.

Cargo assembly 107 is configured to be detachably coupled to subframe assembly 105 via one or more fasteners along extensions 127. In the exemplary embodiment illustrated and described herein, cargo assembly 107 is configured to carry one or more vehicle doors. As such, cargo assembly 107 is shaped and formed so as to provide sufficient structural integrity to fit and support one or more vehicle doors. It is understood that cargo assembly 107 may refer to any shape assembly or device configured to attach to extensions 127 of subframe assembly 105.

Cargo assembly 107 includes hinges 133 and latches 135. Hinges 133 include an aperture 137 concentrically aligned with a corresponding aperture 137 either above or below it on a neighboring hinge 133. Apertures 137 are configured to accept corresponding door mounts on the vehicle doors. Latches 135 are configured to accept and mate with door latches on the vehicle doors. It is understood that cargo assembly 107 may include anywhere from one to four different vehicular door attachment locations, each of which may include two hinges 133 and a corresponding latch 135.

Figure 8:
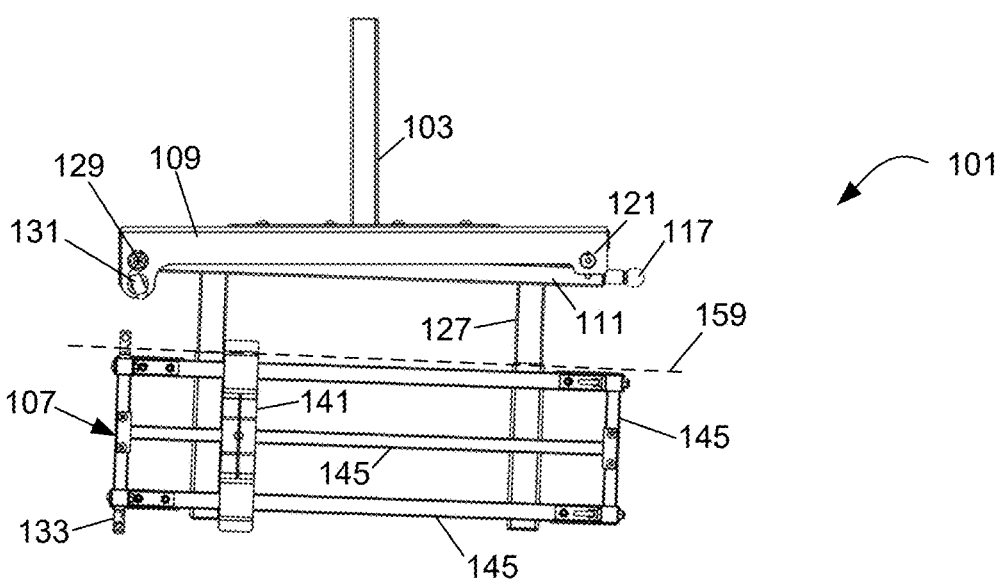
FIG. 8 is a top view of the assembly of FIG. 1.

Referring now also to FIGS. 6-8 in the drawings, views of a portion of cargo assembly 107 are illustrated. Cargo assembly 107 includes a frame 139 and a stabilizer 141. Frame 139 includes upper supports 143 and cross members 145. Cross members 145 extend between upper supports 143 and even between other cross members 145. A visualization of this can be seen in the top view of FIG. 8.

FIGS. 6-7 provide illustrated views of stabilizer 141. In FIG. 6, an enlarged side view of stabilizer 141 is provided. Stabilizer 141 is configured to selectively couple to frame 139 and act to secure vehicle doors in a closed latched position. Stabilizer 141 includes a central shaft 147 that passes through or adjacent to a cross member 145. The securing of vehicle doors is accomplished by extending portions of stabilizer 141 over and around portions of the vehicle door. To accomplish this, stabilizer 141 includes a wing 149 couple to shaft 147. Wing 149 extends up and away from shaft 147. Wing 149 is configured to include a lowered tip 152 at its distal end. A vehicle door would be located along the underside of the highest point of wing 149 wherein the lowered tip is configured to prevent the opening of the door.

It is understood that two wings 149 may be used wherein the wings 149 extend in opposite directions from shaft 147. Stabilizer 141 may include a web 151 extending their between the wings to provide structural rigidity. Stabilizer 141 may also be removed from cross members 145, wherein stabilizer 141 may include a handle aperture 153 to facilitate grasping and maneuvering of stabilizer 141. Central shaft 147 Includes one or more grooves 155. Grooves 155 may extend circumferentially around an outer surface of shaft 147 and are used by a user to selectively locate a relative height of stabilizer 141 relative to frame 139. As seen in FIG. 6, stabilizer 141 is passed through a cylindrical shaft coupled to cross member 145. Cargo assembly 107 may include a set pin 157 in communication with this cylindrical shaft wherein the set pin 157 is configured to pass into one or more of the grooves 155. Set pin 157 may operate in a similar form and function to that of translating shaft 117. It is understood that the precise shape of stabilizer 141 is not restricted to the depicted embodiment. Stabilizer 141 may take many forms but is primarily configured to secure vehicle doors in a manner that restricts undesired opening of the doors when mounted on frame 139.

As seen in particular with FIG. 8 of the drawings, a top view of assembly 101 is provided. As stated, stabilizer 141 may take different forms. As seen in the drawings, stabilizer 141 is configured to extend over and/or pass through a portion of the vehicle door. It is understood that frame 139 defines a plane 159 that extends between corresponding hinges 133 and latch 135 or an operable single door. Each door location has its own defined plane of reference. Stabilizer 141 is ideally formed and configured to extend beyond the limits of frame 139 and pass over or through plane 159 as defined by each door location.

Figure 9:
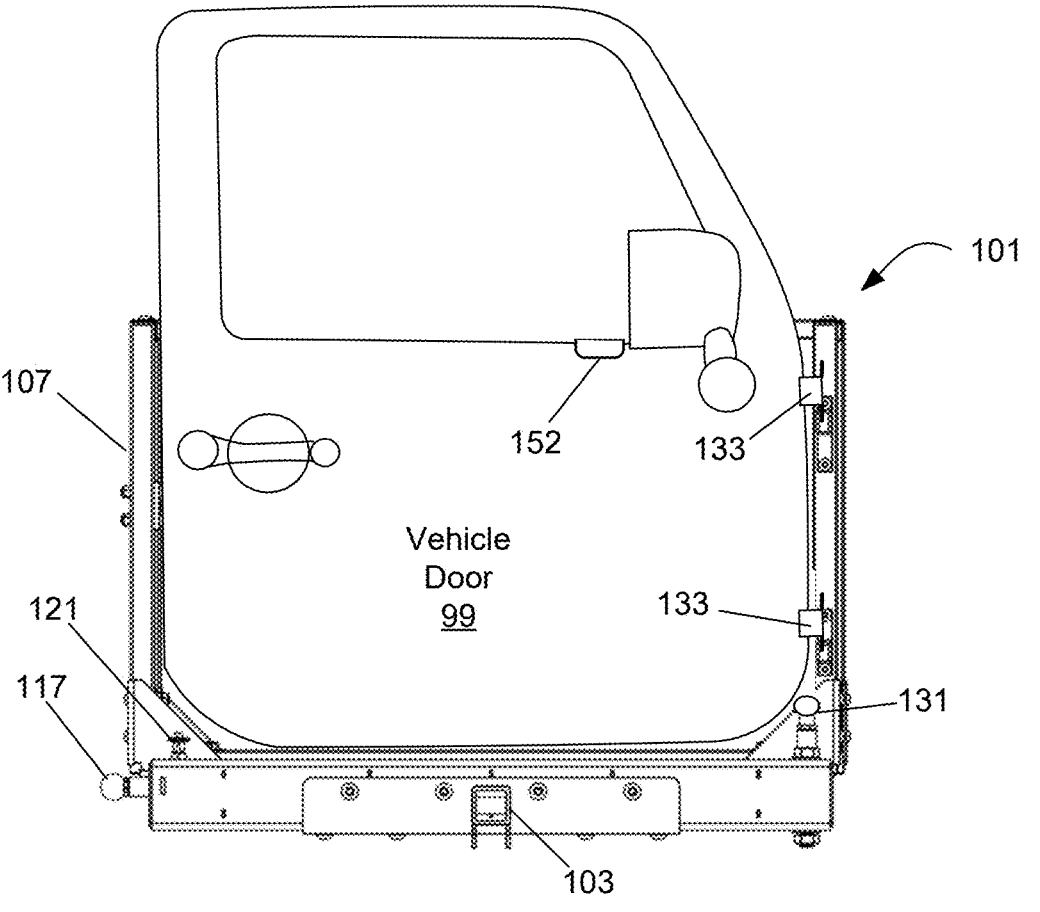
FIG. 9 is a rear view of the assembly of FIG. 7 with a set of vehicle doors included.

Referring now also to FIG. 9 in the drawings, a front view of assembly 101 is illustrated with a vehicle door 99 included. 152 of stabilizer 141 is illustrated passing through the window opening of vehicle door 99. Stabilizer 141 is adjustable such that wing 149 is situated or located adjacent to or in contact with the lower window opening a vehicle door 99. It is understood that stabilizer 141 may be situated a long cross member 1:45 so as to operate along any portion of the window opening of vehicle door 99.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A hitch mounted door assembly for holding one or more doors of a vehicle, comprising:
   a hitch mount;
   a subframe assembly coupled to the hitch mount, the subframe assembly includes a first arm and a second arm, the first arm being coupled to the hitch mount in a rigid configuration, the second arm configured to selectively change orientation relative to the first arm and hitch mount, the second arm configured to rotate about a first axis at the first end so as to permit rotation of the second arm between an open orientation and a closed orientation, both the first end and the second end being equally distal from the hitch mount; and
   a cargo assembly releasably coupled to the subframe assembly and being configured to carry a load;
   wherein the first arm is partially open to allow the second arm to translate and interlock partially within the first arm to conserve space;
   wherein each of the first arm and the second arm extend between the first end and the second end to produce an evenly distributed load on the hitch mount.

2. The assembly of claim 1, wherein the subframe assembly is removable from the hitch mount.

3. The assembly of claim 1, wherein the second end includes a dual lock assembly to selectively secure the second arm in the closed orientation, the dual lock assembly includes a plurality of pins oriented perpendicular to one another and each secured to a different one of the first arm and the second arm, each of the plurality of pins being captive to prevent removal from both the first arm and the second arm.

4. The assembly of claim 1, wherein rotation of the subframe assembly into the open orientation permits access to the vehicle while retaining cargo in the cargo assembly.

5. The assembly of claim 1, wherein the cargo assembly is removable from the subframe assembly.

6. The assembly of claim 1, wherein the cargo assembly is configured to maintain a stored orientation of one or more vehicle doors.

7. The assembly of claim 1, wherein the cargo assembly includes a frame and a stabilizer selectively coupled to the frame.

8. The assembly of claim 7, wherein the stabilizer is configured to extend over a portion of the frame, the stabilizer configured to be adjustable so as to be set in multiple height positions relative to the frame.

9. The assembly of claim 7, wherein the frame includes hinge and latch post locations to facilitate the hanging and latching of a vehicle door.

10. The assembly of claim 9, wherein the stabilizer is configured to pass over a plane defined by the intersection of the latch post and the hinge.

11. A hitch mounted door assembly for holding one or more doors of a vehicle, comprising:

a hitch mount;

a subframe assembly coupled to the hitch mount and includes a first arm and a second arm defining a first end and a second end, the first arm being coupled to the hitch mount in a set configuration, the second arm configured to change orientation relative to the first arm and the hitch mount, the second arm configured to pivot relative to the first arm at the first end, both the first end and the second end being distal from the hitch mount; and a cargo assembly configured to releasably couple to the subframe assembly, the cargo assembly includes a frame having a plurality set of hinges, the frame includes a cross member spanning the frame between the plurality set of hinges, and a stabilizer configured to couple to the cross member, the stabilizer is configured to extend over a portion of the frame from between the plurality set of hinges, the stabilizer being adjustable between multiple height positions relative to the frame;

wherein the location and height of the stabilizer along the cross member is adjustable, the stabilizer configured to prevent removal of a vehicle door to one of the plurality set of hinges.

12. The assembly of claim 11, wherein the subframe assembly is removable from the hitch mount.

13. The assembly of claim 11, wherein the subframe assembly is configured to detach at the second end so as to permit rotation about the first end.

14. The assembly of claim 11, wherein the second end is selectively coupled in a closed orientation.

15. The assembly of claim 11, wherein the subframe assembly being pivoted into an open orientation permits access to the subframe without obstruction by the rack assembly.

16. The assembly of claim 15, wherein the first end and the second end are equally distal from the hitch mount.

17. The assembly of claim 15, wherein the frame includes a latch post location to facilitate the hanging and latching of the vehicle door.

18. The assembly of claim 17, wherein the stabilizer is configured to pass over a plane defined by the intersection of the latch post and one of the plurality set of hinges.

\* \* \* \* \*